United States Patent [19]

Schaal et al.

[11] 4,121,682

[45] Oct. 24, 1978

[54] RADIATOR MOUNTING OF A VEHICLE, ESPECIALLY OF A MOTOR VEHICLE

[75] Inventors: Hans Schaal; Wolf-Dieter Kurz, both of Stuttgart; Ulrich Breitling, Esslingen, all of Germany

[73] Assignee: Daimler-Benz Aktiengesellschaft, Germany

[21] Appl. No.: 752,987

[22] Filed: Dec. 21, 1976

[30] Foreign Application Priority Data

Dec. 22, 1975 [DE] Fed. Rep. of Germany ....... 2557967

[51] Int. Cl.$^2$ ............................................. B60K 11/02
[52] U.S. Cl. ................................................. 180/68 R
[58] Field of Search .................... 180/68 R, 68 P, 68.5

[56] References Cited

U.S. PATENT DOCUMENTS

| 3,121,467 | 2/1964 | Bryant | 180/68 R |
|---|---|---|---|
| 3,123,170 | 3/1964 | Bryant | 180/68 R |
| 3,318,409 | 5/1967 | Kiehnle | 180/68 R |
| 3,340,948 | 9/1967 | Deckert et al. | 180/68 R |

FOREIGN PATENT DOCUMENTS

| 2,035,306 | 1/1972 | Fed. Rep. of Germany | 180/68 R UX |
|---|---|---|---|
| 2,018,457 | 11/1971 | Fed. Rep. of Germany | 180/68 R UX |
| 2,018,459 | 11/1971 | Fed. Rep. of Germany | 180/68 R UX |
| 2,089,616 | 12/1971 | France | 180/68 R UX |

Primary Examiner—Joseph F. Peters, Jr.
Assistant Examiner—Gene A. Church
Attorney, Agent, or Firm—Craig & Antonelli

[57] ABSTRACT

A radiator mounting of a vehicle in which the radiator rests by means of at least one mounting support fixed at the radiator on a corresponding mounting support fixed at the vehicle and in which at least one hold-down member secured at a fixed part of the vehicle and cooperating with a corresponding counter-support member at the radiator prevents the lifting of the mounting support fixed at the radiator from its mounting support fixed at the vehicle; the tilting of the radiator about a reference axis in one circumferential direction is thereby counteracted by at least one abutment fixed at the vehicle and cooperating with a counter-abutment fixed at the radiator while a connecting element opposes the tilting of the radiator in the other circumferential direction; a center section of the connecting element thereby additionally cooperates with the counter-support member to perform itself the hold-down function.

48 Claims, 3 Drawing Figures

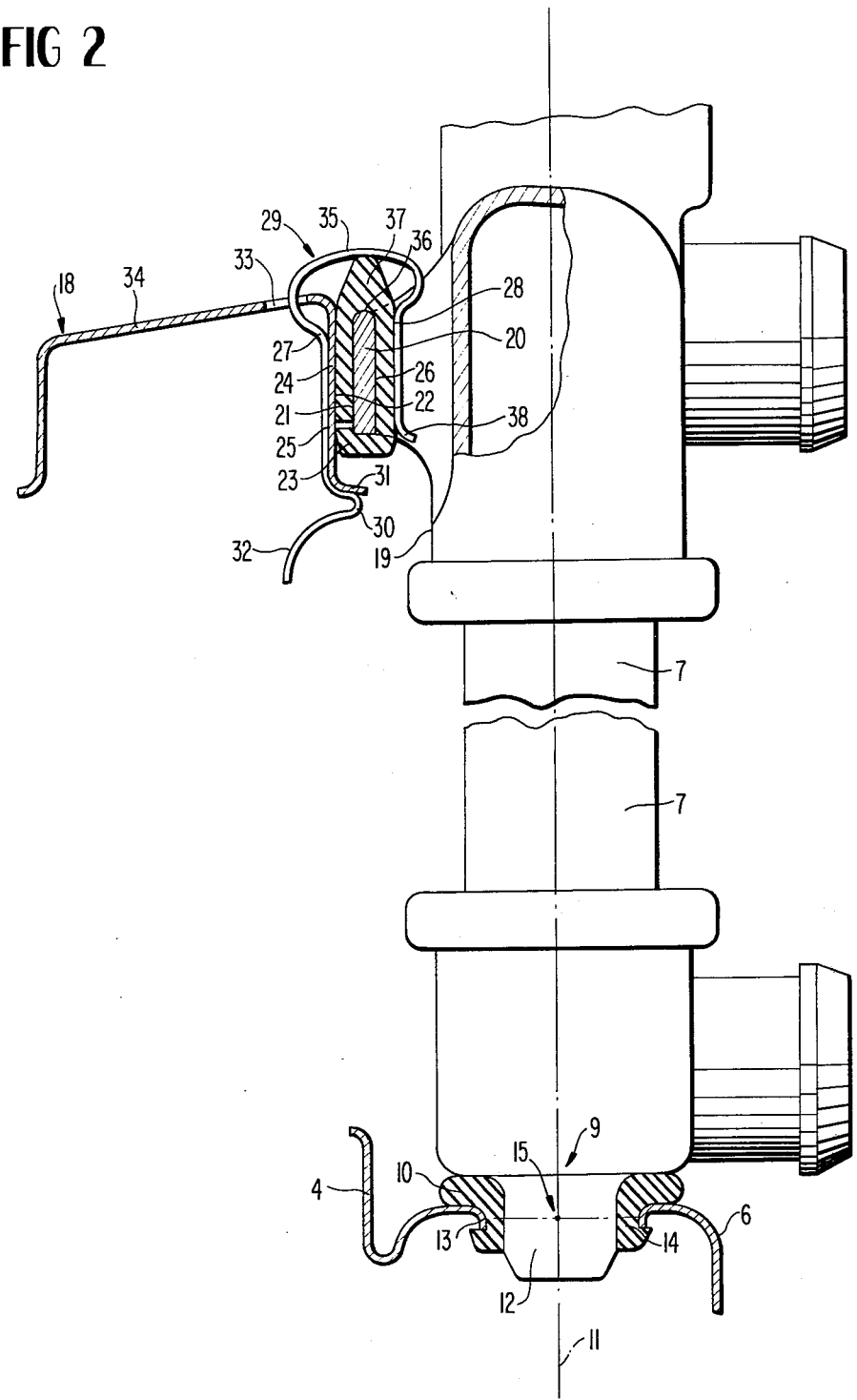

RADIATOR MOUNTING OF A VEHICLE, ESPECIALLY OF A MOTOR VEHICLE

The present invention relates to a radiator mounting and fastening arrangement of a vehicle, especially of a motor vehicle, in which the radiators rest by means of at least one mounting support fixed at the radiator on a corresponding mounting support fixed at the vehicle and in which at least one hold-down member secured at a fixed vehicle part and cooperating with a corresponding counter-support member secured at the radiator prevents the lifting of the mounting support fixed at the radiator from its mounting support fixed at the vehicle, and in which at least one abutment fixed at the vehicle and cooperating with a corresponding counter-abutment fixed at the radiator opposes the tilting of the radiator in one circumferential direction about a reference axis parallel to the plane of contact of the wheels with the road whereas at least one elastic connecting element secured at the radiator and at a relatively fixed vehicle part opposes the tilting of the radiator in the other circumferential direction.

Radiator fastening arrangements of this type are known in the prior art (German Offenlegungsschrift No. 2,035,306) and are characterized especially by a simple assembling ability of the radiator, whence also the series manufacture of the vehicle is facilitated.

In the known radiator mounting and fastening arrangement a rubber buffer or cushion clamped at a cross bearer fixed at the vehicle by a bolt or screw cooperates as hold-down member with a half-shell-shaped counter-support member secured at the adjacent radiator surface. The rubber buffer or cushion serves simultaneously as abutment for securing the radiator against tilting in the one circumferential direction of the reference axis. In the other circumferential direction, the radiator is secured against tilting by a rubber ring serving as connecting element which is suspended on the radiator side at the filler pipe and at a fastening pin of the cross bearer on the vehicle side.

The present invention is concerned essentially with the task to keep as small as possible the structural expenditures in a radiator mounting and fastening arrangement of the aforementioned type.

The underlying problems are solved according to the present invention in an advantageous manner in that a center section of the connecting element additionally cooperates as hold-down member with the counter-support member.

In a radiator fastening arrangement according to the present invention, the fastening on the vehicle side of the connecting element acts by way of the center section thereof as hold-down member on the radiator so that a separate structural part for the hold-down member is economized.

Whereas in the prior art radiator fastening arrangement, a half-shell which is arranged structurally separate from the filler pipe serving as fastening part for the connecting element, serves as counter-support member, in the radiator fastening arrangement according to the present invention a separate counter-support member is avoided in that the center section of the connecting element serving as hold-down member cooperates with an additional fastening part for the fastening of the connecting element which is fixed at the radiator and is operable as counter-support member.

The structural expenditure of the known radiator fastening by means of a rubber buffer serving as abutment for the radiator and by means of a separate fastening pin for the rubber ring operating as connecting element is reduced in the radiator fastening arrangement according to the present invention in that a fastening part fixed at the vehicle for the fastening of the connecting element is constructed additionally as abutment against the tilting of the radiator.

In the known radiator fastening arrangement, a section of the radiator surface adjacent the cross bearer of the vehicle serves as counter-abutment for the rubber buffer. In contradistinction thereto, it is advantageous in the radiator fastening according to the present invention that the abutment against the tilting of the radiator cooperates with a fastening part for the fastening of the connecting element which is fixed at the vehicle and additionally is constructed as counter-abutment.

In the prior art radiator fastening arrangement, stresses and strains may occur in the radiator block if the axis of the half-shell operable as counter-support member is not aligned with the axis of the cylindrical rubber buffer operating as hold-down member. These difficulties are avoided in the radiator fastening according to the present invention in that the hold-down member and the counter-support member are constructed for the absorption exclusively of the forces acting essentially in the direction of the mounting support axis.

The stresses and strains in the radiator block may also occur in the prior art radiator fastening when one or both axes of the filler pipe and of the fastening pin are not located in the symmetry plane containing the cylinder axis of the cylindrical half-shell operable as counter-support member or in a plane parallel thereto. In contradistinction thereto, the radiator fastening according to the present invention is so constructed that at least one of the two fastening means of the connecting element permits relative movement of the connecting element along the reference axis with respect to the radiator or the vehicle. In this manner, forces which stem from the elastic forces of the connecting element are avoided on the radiator in the directions of the reference axis.

For manufacturing reasons, tolerances at the radiator in relation to the distance between the mounting support and counter-support member as well as at the vehicle in relation to the distance between the mounting support and the hold-down member cannot be avoided. These tolerances may also be the cause of forces acting on the radiator block which stem from the radiator fastening. In order to avoid such forces, provision is made in the radiator fastening according to the present invention that the fastening of the connecting element at the radiator permits relative movements of the radiator with respect to the connecting element along the mounting support axis.

In one advantageous embodiment of the radiator fastening according to the present invention which is characterized especially by the simple installation of the connecting element provision is made that a mounting member fixed at the vehicle and a mounting member fixed at the radiator are clamped together by the springily expandable legs of a spring clamp. The arrangement for achieving the hold-down effect is thereby made in such a manner that the legs are disposed essentially parallel to the mounting support axis and one leg is anchored at the mounting member fixed at the vehicle and the counter-support member cooperates with the arcuately shaped bow-like portion of the spring clamp.

With the use of spring clamps of metals, it is advantageous for achieving a damping effect in the radiator fastening according to the present invention that elastic damping means are interconnected between the mounting member fixed at the radiator and the associated leg portions.

In order to avoid damages of the damping means during the relative movements between the radiator and the spring clamp and to thereby facilitate the assembly of the spring clamp, it is advantageous in the radiator fastening according to the present invention that the free end of the leg cooperating with the mounting member fixed at the radiator is bent off opposite to the mounting member.

For purposes of facilitating the assembly and disassembly of the radiator, it is additionally advantageous in the radiator fastening according to the present invention that the anchoring of the leg cooperating with the mounting member fixed at the vehicle is springily disengageable.

Finally, provision is also made in the radiator fastening according to the present invention that one of the two corresponding mounting supports is provided for purposes of avoiding dislocations perpendicular to the mounting support axis with a guide pin cooperating with a corresponding pin guidance of the other mounting support. Such a construction of the radiator fastening according to the present invention is appropriate especially when the hold-down member permits relative movements to the radiator in the directions of the mounting support axis for purposes of compensation of tolerances According to a further feature of the present invention, the radiator fastening according to the present invention can also be used for a vehicle which can be equipped with driving engines of different power and therewith with radiators of differing structural size whereby, however, no structural changes are required as regards the arrangement and construction of the features on the vehicle side of the radiator mounting and fastening arrangements according to the present invention.

In the embodiment of the radiator fastening according to the present invention which is equipped with a spring clamp as connecting element, a surface of the mounting member fixed at the radiator which is clamped fast by the spring clamp, operates as counter-abutment, another surface as fastening part for the spring clamp and a third surface as counter-support member. In order to achieve an elastic damping for these three functions of the mounting member, provision is additionally made in the radiator fastening according to the present invention that the mounting member fixed at the radiator is surrounded by an elastic damping sleeve.

Accordingly, it is an object of the present invention to provide a radiator mounting arrangement of a vehicle, especially of a motor vehicle, which avoids by simple means the aforementioned shortcomings and drawbacks encountered in the prior art.

Another object of the present invention resides in a radiator mounting and securing arrangement for vehicles, which simplifies the assembly and disassembly of the radiator and therewith also the series manufacture of the vehicle.

A further object of the present invention resides in a radiator mounting and fastening arrangement which considerably simplifies its installation and keeps small the structural expenditures required for the assembly.

A still further object of the present invention resides in a radiator fastening arrangement for vehicles which minimizes the number of separate structural parts required therefor.

Still another object of the present invention resides in a radiator mounting arrangement which reduces the number of separate structural parts required while simultaneously facilitating the assembly and disassembly of the radiator without impairment to the completely safe mounting and securing of the radiator under all operating conditions.

Another object of the present invention resides in a radiator fastening for vehicles which avoids stresses and strains in the radiator block while minimizing the transmission of forces onto the radiator which may stem from relative movements between respective parts.

A still further object of the present invention resides in a radiator mounting arrangement for vehicles, especially motor vehicles, in which damping means are effectively interposed to prevent metal-to-metal contact, yet damage of the damping means as a result of relative movements of the respective parts is effectively eliminated.

These and other objects, features and advantages of the present invention will become more apparent from the following description when taken in connection with the accompanying drawing which shows, for purposes of illustration only, one embodiment in accordance with the present invention, and wherein:

FIG. 2 is a cross-sectional view, drawn approximately to actual scale, through the radiator mounting of FIG. 1, taken along line 11—II thereof.

Figure 1:
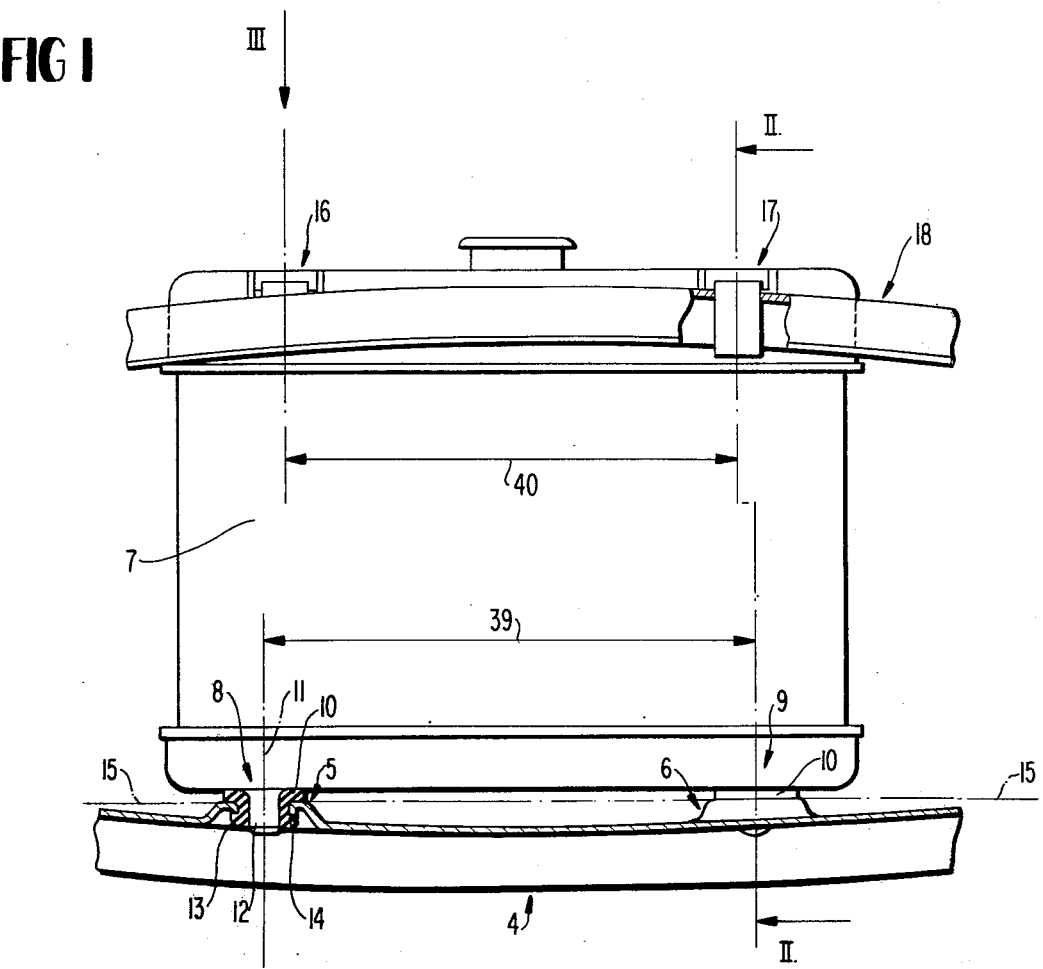
FIG. 1 is a front elevational view, on a reduced scale, of a radiator resting on a lower cross bearer of the motor vehicle (not shown) and secured against tilting at an upper cross bearer in accordance with the present invention.

Referring now to the drawing wherein line reference numerals are used throughout the various views to designate like parts, a lower cross bearer generally designated by reference numeral 4 of the motor vehicle is provided with two mounting supports generally designated by reference numerals 5 and 6, on which a radiator 7 is seated by means of two corresponding mounting supports generally designated by reference numerals 8 and 9 fixed at the radiator. An elastic annular buffer or cushion 10 is interposed between the two corresponding mounting supports 5 and 8 respectively 6 and 9. In order to avoid during relative movements between the cross bearer 4 and the radiator 7 in the directions of the respective mounting support axis 11, dislocations of the two corresponding mounting supports 5 and 8, respectively 6 and 9 with respect to one another perpendicularly to the mounting support axis 11, a guide pin 12 is provided at the mounting support 8 and 9 which engages in a pin guidance 13 of the mounting support 5 and 6 under interposition of an annular section 14 of the annular buffer or cushion 10. However, the guide pin 12 could also be provided in a kinematically reversed manner at the fixed vehicle mounting support 5 and 6 and the pin guidance 13 at the mounting support 8 and 9 fixed at the radiator.

The radiator 7 is as such tiltably arranged about a theoretical reference axis 15 (FIGS. 1 and 2), on which are located the mounting support centers of the pairs of mounting supports 5, 8 and 6, 9 and which thus extends essentially parallel to the plane of contact of opposite wheels of an axle of the motor vehicle with the road surface.

The radiator 7 is secured against tilting about the reference axis 15 at an upper cross bearer 18 fixed at the vehicle, by means of two upper, identically constructed fastening places generally designated by reference numerals 16 and 17.

The fastening places 16 and 17 are constructed as follows:

The radiator 7 is provided with a bow-shaped mounting member generally designated by reference numeral 20 (FIGS. 2 and 3) at an end face 19 adjacent the upper cross bearer 18, whose one surface 21 (FIG. 2) serves as counter-abutment for a surface 22 of the cross bearer 18, which is operable as abutment for the prevention of tilting movements of the radiator 7 in one circumferential direction of the reference axis 15.

The mounting member 20 is surrounded by an elastic damping sleeve 23 so that an elastic damping cushion or buffer is inserted between the surfaces 21 and 22. The surface 22 is located at the leg 24 of the cross bearer 18 having a U-shaped profile open in the downward direction.

The mutually oppositely disposed surfaces 25 and 26 of the leg 24 and of the mounting member 20 serve for the mounting and retention of the two springily expandable legs 27 and 28 of a spring clamp generally designated by reference numeral 29 (FIG. 2), which clamps the mounting member 20 fixed at the radiator against the leg 24 operable as mounting member fixed at the vehicle in order to secure the radiator 7 against tilting in the other circumferential direction of the reference axis 15.

In order to impart to the spring clamp 29 a hold-down function, its leg 27 is anchored at the edge 31 of the leg 24 of the cross bearer 18 by means of a fold or bent-in portion 30. The leg section located between the bent-in portion 30 and the end of the leg portion 27 is constructed as actuating handle 32 for the selective disengagement of the anchoring means 30, 31.

The leg 27 which is anchored on the side of the vehicle extends through an opening 33 in the web 34 of the cross bearer 18 and passes over into a bow-shaped center section 35 which as hold-down member cooperates with a surface 36 at the mounting member 20, which serves as counter-support member in order to counteract the lifting of the mounting support 8 or 9 fixed at the radiator from the corresponding mounting support 5 or 6 fixed at the vehicle. A bulged portion 37 of the damping sleeve 23 which is of relatively large volume is interposed between the center section 35 and the surface 36 in order to create an elastic damping buffer between the metallic parts 35 and 20 and to enable nonetheless relative movements between the vehicle and the radiator in the directions of the mounting support axis 11 for the compensation of manufacturing tolerances.

The free end 38 of the leg 28 of the spring clamp 29 which cooperates with the mounting member 20 fixed at the radiator is bent off in a direction opposite the mounting member 20. In this manner, the last-mentioned relative movements as also the assembly of the spring clamp are facilitated as well as damages of the damping sleeve 23 are avoided.

Since the leg 28 of the spring clamp 29 is exclusively in sliding contact with the mounting member 20 fixed at the radiator, relative movements in the directions of the mounting support axis 11 are possible between the clamping surface 26 and the leg 28.

Figure 3:
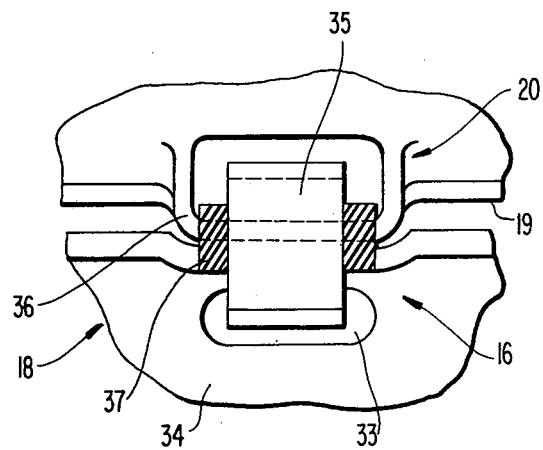
FIG. 3 is a partial plan view, drawn approximately to scale, on one of the two upper fastening places of the radiator of FIG. 1, as viewed in the direction of arrow III.

As can be readily seen from FIGS. 2 and 3, no forces acting in the directions of the reference axis 15—apart from the friction—can occur between the spring-leaf-like center section 35 and the bulged portion 37 so that stresses and strains in the radiator are avoided if the mounting members 20 are not in the intended position in the directions of the reference axis 15 as a result of manufacturing tolerances.

Both the leg 27 as also the leg 28 of the spring clamp 29 are relatively movable in the directions of the reference axis 15 with respect to the associated fastening part, namely, with respect to the surfaces 25 and 26. Consequently, forces which stem from the spring stress of the spring clamp and which act in the directions of the reference axis cannot be transmitted onto the radiator 7.

The damping sleeve 23 forms in an advantageous manner also an elastic damping buffer between the mounting member 20 fixed at the radiator and the associated leg 28 of the spring clamp 29.

If one provides in radiators with different dimensions in the directions of the reference axis 15, the same distance 39 (FIG. 1) for the mounting supports 8 and 9, then the same can be used without changes at the lower cross bearer 4 in the same vehicle type.

Similarly, it is also advantageous to keep the distance 40 for the mounting members 20 identical in radiators with dimensions different in the directions of the reference axis 15, so that the surface 36 operating as counter-support member and the surface 21 serving as counter-abutment as well as the surface 26 of the radiators which serves for the clamping-in of the spring clamp 29, are always in the proper position relative to the fastening places 16 and 17, whence these radiators can be installed without changes at their fastening means in the same vehicle type.

Finally, it is of advantage to keep the two sides of the radiator free from fastening means, i.e., to keep the distances 39 and 40 always smaller than the structural length of the radiator.

The present invention is also applicable to three-point radiator mounting and fastening arrangements of any known type in which either only one mounting support or only one upper fastening place 16 or 17 is provided.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A radiator mounting of a vehicle, comprising mounting support means fixed on the radiator and on the vehicle, the radiator resting by means of at least one mounting support means fixed on the radiator on a corresponding mounting support means fixed on the vehicle, mutually cooperating means secured on a relatively fixed vehicle part and on the radiator and operable as hold-down means and counter-support means for preventing the lifting of the mounting support means fixed on the radiator from the respective mounting support means fixed on the vehicle, and means for preventing the tilting of the radiator in both circumferential directions relative to a reference axis including abutment means fixed on the vehicle and cooperating with counter-abutment means fixed on the radiator for preventing the tilting of the radiator relative to said reference axis in one circumferential direction, and elastic connecting means operatively connected on the radiator and on a relatively fixed vehicle part for preventing the tilting in the other circumferential direction, characterized in that the connecting means additionally cooperates with one of said mutually cooperating means to effectively perform the hold-down function preventing the lifting of the mounting support means on the radiator from the mounting support means on the vehicle.

2. A radiator mounting according to claim 1, characterized in that a center section of said connecting means cooperates as hold-down means with the counter-support means.

3. A radiator mounting according to claim 2, characterized in that said connecting means includes spring clamp means.

4. A radiator mounting according to claim 3, characterized in that the counter-support means is formed by surface means.

5. A radiator mounting according to claim 4, characterized in that said reference axis is essentially parallel to a plane through the point of contact of the wheels of a respective axle with the road surface.

6. A radiator mounting according to claim 2, characterized in that the center section of the connecting means serving as hold-down means cooperates with an additional means fixed on the radiator and operable as counter-support means, for the fastening of the connecting means.

7. A radiator mounting according to claim 6, characterized in that the additional means includes a mounting member.

8. A radiator fastening according to claim 6, characterized in that a part of the connecting means, which is fixed on the vehicle, is additionally constructed as abutment means to prevent the tilting of the radiator.

9. A radiator mounting according to claim 8, characterized in that said last-mentioned part includes a leg of a spring clamp means.

10. A radiator mounting according to claim 8, characterized in that the abutment means cooperates with an addition part for fastening the connecting means, which is fixed on the radiator and is constructed as counter-abutment means.

11. A radiator mounting according to claim 10, characterized in that said additional part includes a mounting member for fastening the connecting means in the form of spring clamp means.

12. A radiator mounting according to claim 10, characterized in that the hold-down means including the center section and the counter-support means including surface means are constructed for the absorption exclusively of forces acting essentially in the direction of the mounting support axis.

13. A radiator mounting according to claim 12, characterized in that at least one of two fastening means for the connecting means enables relative movements of the connecting means along the reference axis with respect to at least one of radiator and vehicle.

14. A radiator mounting according to claim 13, characterized in that the fastening means of the connecting means at the radiator enables relative movements of the radiator with respect to the connecting means along the mounting support axis.

15. A radiator mounting according to claim 14, characterized in that a mounting means fixed on the vehicle and a mounting means fixed on the radiator are clamped together by the springily expandable legs of a spring clamp means forming part of the connecting means.

16. A radiator mounting according to claim 15, characterized in that the legs of the spring clamp means are disposed essentially parallel to the mounting support axis, one of said legs being anchored at the mounting means fixed at the vehicle while the counter-support means cooperates with the approximately bow-shaped center section of the spring clamp means.

17. A radiator mounting according to claim 16, characterized in that the hold-down means is formed by a leg portion of a cross bearer while the counter-support means is formed by surface means of the mounting means fixed on the radiator.

18. A radiator mounting according to claim 16, characterized in that elastic damping means are interposed between the mounting means fixed on the radiator and the associated leg of the spring clamp means.

19. A radiator mounting according to claim 18, characterized in that said camping means include a damping sleeve.

20. A radiator mounting according to claim 18, characterized in that the free end of the leg of the spring clamp means which cooperate with the mounting means fixed on the radiator is bent off opposite to the last-mentioned mounting means.

21. A radiator mounting according to claim 20, characterized in that anchoring means of the leg of the spring clamp means which cooperates with the mounting means fixed at the vehicle is springily disengageable.

22. A radiator mounting according to claim 21, characterized in that one of two corresponding mounting support means cooperating with one another includes guide pin means cooperating with a corresponding pin guidance means of the other mounting support means for purposes of avoiding dislocations, perpendicular to the mounting support axis.

23. A radiator mounting according to claim 21, characterized by the use of radiators which have respectively different structural lengths in the direction of the reference axis but are substantially identical as regards the distances between the mounting support means thereof in said directions.

24. A radiator mounting according to claim 23, characterized by the use of radiators which have different structural lengths respectively in the directions of the reference axis but are substantially identical as regards the distance between the counter support means in said directions.

25. A radiator mounting according to claim 24, characterized by the use of radiators which have respectively different structural lengths in the directions of the reference axis but are substantially identical as regards the distances between their counter-abutment means in said directions.

26. A radiator mounting according to claim 25, characterized by the use of radiators which have different structural lengths in the direction of the reference axis but are substantially identical as regards the distances between the fastening means for the connecting means in said directions.

27. A radiator mounting according to claim 26, characterized in that the identical distances are respectively smaller than the structural length of the radiator.

28. A radiator fastening according to claim 22, characterized in that the mounting means fixed on the radiator is arranged at the end face of the radiator disposed opposite the abutment means.

29. A radiator fastening according to claim 28, characterized in that the mounting means fixed on the radiator is surrounded by an elastic damping sleeve means.

30. A radiator fastening according to claim 1, characterized in that a part of the connecting means, which is fixed on the vehicle, is additionally constructed as abutment means to prevent the tilting of the radiator.

31. A radiator mounting according to claim 30, characterized in that said last-mentioned part includes a leg of a spring clamp means.

32. A radiator mounting according to claim 31, characterized in that the abutment means cooperates with an additional part for fastening the connecting means, which is fixed on the radiator and is constructed as counter-abutment means.

33. A radiator mounting according to claim 1, characterized in that the hold-down means and the counter-support means are constructed for the absorption exclusively of forces acting essentially in the direction of the mounting support axis.

34. A radiator mounting according to claim 1, characterized in that at least one of two fastening means for the connecting means enables relative movements of the connecting means along the reference axis with respect to at least one of radiator and vehicle.

35. A radiator mounting according to claim 34, characterized in that the fastening means of the connecting means at the radiator enables relative movements of the radiator with respect to the connecting means along the mounting support axis.

36. A radiator mounting according to claim 1, characterized in that a mounting means fixed on the vehicle and a mounting means fixed on the radiator are clamped together by the springily expandable legs of a spring clamp means forming part of the connecting means.

37. A radiator mounting according to claim 36, characterized in that the legs of the spring clamp means are disposed essentially parallel to the mounting support axis, one of said legs being anchored on the mounting means fixed on the vehicle while the counter-support means cooperates with the approximately bow-shaped center section of the spring clamp means.

38. A radiator mounting according to claim 36, characterized in that elastic damping means are interposed between the mounting means fixed on the radiator and the associated leg of the spring clamp means.

39. A radiator mounting according to claim 36, characterized in that the free end of the leg of the spring clamp means which cooperates with the mounting means fixed on the radiator is bent off opposite to the last-mentioned mounting means.

40. A radiator mounting according to claim 36, characterized in that anchoring means of the leg of the spring clamp means which cooperates with the mounting means fixed on the vehicle is springily disengageable.

41. A radiator mounting according to claim 1, characterized in that one of two corresponding mounting support means cooperating with one another includes guide pin means cooperating with a corresponding pin guidance means of the other mounting support means for purposes of avoiding dislocations, perpendicular to the mounting support axis.

42. A radiator mounting according to claim 1, characterized by the use of radiators which have respectively different structural lengths in the directions of the reference axis but are substantially identical as regards the distances between the mounting support means thereof in said directions.

43. A radiator mounting according to claim 42, characterized by the use of radiators which have different structural lengths respectively in the directions of the reference axis but are substantially identical as regards the distances between the counter support means in said directions.

44. A radiator mounting according to claim 43, characterized by the use of radiators which have respectively different structural lengths in the directions of the reference axis but are substantially identical as regards the distances between their counter-abutment means in said directions.

45. A radiator mounting according to claim 44, characterized by the use of radiators which have different structural lengths in the direction of the reference axis but are substantially identical as regards the distances between the fastening means for the connecting means in said directions.

46. A radiator mounting according to claim 45, characterized in that the identical distances are respectively smaller than the structural length of the radiator.

47. A radiator fastening according to claim 36, characterized in that the mounting means fixed at the radiator is arranged at the end face of the radiator disposed opposite the abutment means.

48. A radiator fastening according to claim 36, characterized in that the mounting means fixed at the radiator is surrounded by an elastic damping sleeve means.

* * * * *